United States Patent [19]

Langan et al.

[11] Patent Number: 5,910,294
[45] Date of Patent: Jun. 8, 1999

[54] ABATEMENT OF NF₃ WITH METAL OXALATES

[75] Inventors: John Giles Langan, Wescosville; Howard Paul Withers, Jr., Breinigsville, both of Pa.

[73] Assignee: Air Products and Chemicals, Inc., Allentown, Pa.

[21] Appl. No.: 08/971,545

[22] Filed: Nov. 17, 1997

[51] Int. Cl.⁶ ............................. C01B 21/00; C01B 9/08; C01J 8/00
[52] U.S. Cl. ....................... 423/235; 423/235; 423/239.1; 423/489
[58] Field of Search ................................. 423/235, 239.1, 423/489

[56] References Cited

U.S. PATENT DOCUMENTS

| | | | |
|---|---|---|---|
| 4,323,544 | 4/1982 | Magder | 423/239 |
| 4,975,259 | 12/1990 | Hyakutake et al. | 423/406 |
| 5,183,647 | 2/1993 | Harada et al. | 423/239 |
| 5,417,934 | 5/1995 | Smith et al. | 422/177 |
| 5,417,948 | 5/1995 | Iwata et al. | 423/239.1 |
| 5,597,540 | 1/1997 | Akita et al. | 423/241 |
| 5,800,792 | 9/1998 | Ibaraki et al. | 423/210 |
| 5,832,746 | 11/1998 | Nagamura | 62/623 |

OTHER PUBLICATIONS

J. Burdeniiuc and R. H. Crabtree, Mineralization of Chlorofluorocarbons and Aromatization of Saturated Fluorocarbons by a Convenient Thermal Process, Science, vol. 271, Jan. 19, 1996, pp. 340–341.

*Primary Examiner*—Gary P. Straub
*Assistant Examiner*—Cam N. Nguyen
*Attorney, Agent, or Firm*—Geoffrey L. Chase

[57] ABSTRACT

A process for abating $NF_3$ by contacting it with a metal oxalate or carbonate.

10 Claims, No Drawings

ABATEMENT OF NF₃ WITH METAL OXALATES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Nitrogen trifluoride ($NF_3$) is an etchant gas having major utility in the processing of semiconductor materials and particularly in cleaning of furnaces and tools in the manufacture of electronic devices.

$NF_3$ has been recognized as a global warming gas specie by the industrialized world. This in addition to the fact that it is difficult to abate $NF_3$ efficiently and very effectively, makes the use of $NF_3$ by the electronics industry problematic.

Previous attempts to abate $NF_3$ include burning it at high temperatures, which create undesirable nitrogen oxide effluents, reaction of $NF_3$ with carbon, which generates $CF_4$, a much stronger global warming gas and may be explosive, or reaction of $NF_3$ with metal oxides at elevated temperature, which also creates undesirable nitrogen oxide effluents.

Chlorofluorocarbons have been abated by the use of sodium oxalate. Additionally, oxalates have been used to unsaturate fully fluorinated fluorocarbons. See J. Burdeniiuc and R. H. Crabtree, Mineralization of Chlorofluorocarbons and Aromatization of Saturated Fluorocarbons by a Convenient Thermal Process, Science, vol 271, Jan. 19, 1996, pp340–341.

The drawbacks of the prior art abatements of $NF_3$ are overcome by the present invention which can abate even dilute quantities of $NF_3$ safely and efficiently without nitrogen oxide byproducts and without danger or explosion, as will be set forth in greater detail below.

BRIEF SUMMARY OF THE INVENTION

The present invention is a process for abatement of $NF_3$ in gas streams containing $NF_3$ comprising contacting the gas stream containing $NF_3$ with a reagent selected from the group consisting of metal oxalates, metal carbonates and mixtures thereof under reaction conditions sufficient to abate the $NF_3$.

Preferably, the metal is selected from the group consisting of alkali metals, alkali earth metals and mixtures thereof.

More preferably, the reagent is sodium oxalate.

Alternatively, the reagent is calcium oxalate.

Further alternatively, the reagent is cesium oxalate.

Yet another alternative is that the reagent is sodium carbonate.

Preferably, the temperature of the reaction conditions is in the range of approximately 300 to 450° C.

Preferably, the $NF_3$ is present in the gas containing $NF_3$ in an amount of no greater than approximately 1% by volume.

Preferably, the gas containing $NF_3$ contacts the reagent in a packed bed of the reagent. Alternately, the reagent is in a fluidized bed.

Preferably, the $NF_3$ is abated to less than 10 ppm by volume.

BRIEF DESCRIPTION OF SEVERAL VIEWS OF THE DRAWINGS

Not Applicable

DETAILED DESCRIPTION OF THE INVENTION

Nitrogen trifluoride ($NF_3$) has wide applicability for etching and cleaning in the semiconductor industry. It can be used in thermal and plasma cleaning of process tools, furnaces, appliances and components that become fouled with the by-products and materials used during deposition of various films and layers in the fabrication of electronic devices, such as integrated circuits. Typically, layers of silicon dioxide, silicon nitride, as well as various metals, are deposited on silicon substrates in furnaces in electronic fabs. These deposits are performed by chemical vapor deposition, sputtering, and other techniques, but are generally non-specific in that they deposit materials not only on the targeted area, but also on the furnace and tools used for the deposition.

Periodic cleaning of such tools and furnaces is required. $NF_3$ is widely used to effect the etch and clean of such furnaces and tools. The problem arises when the furnace and tools are evacuated during the cleaning procedure. The evacuated gases and effluents typically contain minor quantities of unreacted $NF_3$. The industry is concerned about $NF_3$ effluent due to its determination to be a global warming gas and its toxicity, which requires that it be abated below its Threshold Limit Value (TLV) of 10 parts per million (ppm). Adequate abatement has not been practiced to date, due to the expense, inefficiency or alternative by-products of known abatement techniques. Although $NF_3$ is a strong oxidizer, at room temperature it is difficult to abate from process streams at low levels of approximately 1% by volume or less.

Abating $NF_3$ using metal oxalates, such as alkali metal or alkaline earth metal metal oxalates or carbonates overcomes the problem of abatement of $NF_3$ without forming undesired by-products such as nitrogen oxides. Appropriate oxalates and carbonates include sodium, calcium, potassium, lithium and cesium salts. Elevated temperatures are desirable, such as temperatures in excess of approximately 300° C., preferably approximately 300 to 450° C. The reaction is typified as follows;

$$2NF_3 + 3Na_2C_2O_4 = N_2 + 6CO_2 + 6NaF$$

The experimental examples involved placing the metal oxalate into a Monel reactor which is then heated to a temperature in the range of approximately 300 to 450° C. A gas containing approximately 1% by volume $NF_3$ is introduced into the reactor at an appropriate flowrate. The $NF_3$ reacts with the metal oxalate to form metal fluorides, nitrogen and carbon dioxide. The nitrogen and carbon dioxide can be vented without any further treatment and the metal fluoride can be disposed of as a solid salt when the bed is nearly fully consumed. The $NF_3$ reduction from the feed gas content to the effluent gas content is at least 75% by volume, preferably 90% by volume, most preferably approximately 100% by volume. Target reductions would be at or below 10 ppm of $NF_3$ in the effluent gas, most preferably at or below 1 ppm of $NF_3$ in the effluent gas.

More specifically, the examples were performed in a 0.5×1.0 inch Monel reactor containing 15 cc of metal oxalate at a temperature of 200 to 500° C. with an $NF_3$ flow of 1–3 sccm in an inert gas flow of 89–267 sccm of helium. The results for a number of experimental runs are reported in Table 1, below.

calcium oxalate, the process is run at relatively low temperature and results in nonhazardous by-products. Under normal conditions, there is relatively no risk of explosive conditions existing. This process also does not convert $NF_3$ to HF gas or other gaseous fluoride, which gaseous fluorides must be treated in an aqueous-based scrubber system.

TABLE 1

| Run Sequence | Run No. | Temp., C. | Vol. % $NF_3$ | He, sccm | $NF_3$, sccm | GHSV | Time, sec. | % $NF_3$ loss | Comments |
|---|---|---|---|---|---|---|---|---|---|
| Reaction of $NF_3$ with sodium oxalate: $NF_3 + Na_2C_2O_4 \rightarrow NaF + N_2 + CO_2$ 0.5" Monel reactor packed w/15-cc of $Na_2C_2O_4$ (20.5 g) | | | | | | | | | |
| 1 | 15227-5-622 | 200 | 1 | 89 | 1 | 360 | 10 | 14 | |
| 2 | 15227-5-624 | 275 | 1 | 89 | 1 | 360 | 10 | 13 | |
| 3 | 15227-5-626 | 350 | 1 | 89 | 1 | 360 | 10 | 40 | |
| 4 | 15227-6-628 | 350 | 1 | 89 | 1 | 360 | 10 | 40 | |
| 5 | 15227-6-631 | 450 | 1 | 89 | 1 | 360 | 10 | 100 | |
| 6 | 15227-6-634 | 400 | 1 | 89 | 1 | 360 | 10 | 100 | |
| 7 | 15227-7-637 | 400 | 1 | 178 | 2 | 720 | 5 | 33 | |
| 8 | 15227-7-640 | 450 | 1 | 178 | 2 | 720 | 5 | 78 | |
| 9 | 15227-7-643 | 450 | 1 | 89 | 1 | 360 | 10 | 100 | |
| Reaction of $NF_3$ with sodium carbonate: $NF_3 + Na_2CO_3 \rightarrow NaF + CO_2 + O_2 + N_2$ 0.5" Monel reactor packed w/15-cc of $Na_2CO_3$ (18.5 g) | | | | | | | | | |
| 1 | 15227-9-657 | 200 | 1 | 89 | 1 | 360 | 10 | 3 | |
| 2 | 15227-9-660 | 300 | 1 | 89 | 1 | 360 | 10 | 79 | |
| 3 | 15227-9-662 | 400 | 1 | 89 | 1 | 360 | 10 | 100 | |
| 4 | 15227-10-666 | 400 | 1 | 178 | 2 | 720 | 5 | 69 | |
| 5 | 15227-10-669 | 500 | 1 | 178 | 2 | 720 | 5 | 95 | no N2 |
| Reaction of $NF_3$ with calcium oxalate: $NF_3 + CaC_2O_4 \rightarrow CaF_2 + CO_2 + N_2$ 1.0" Monel reactor packed w/15-cc of $CaC_2O_4$ on graphite boat (6.86 g) | | | | | | | | | |
| 1 | 15227-11-672 | 200 | 1 | 89 | 1 | 360 | 10 | 10 | |
| 2 | 15227-11-675 | 300 | 1 | 89 | 1 | 360 | 10 | 96 | |
| 3 | 15227-12-678 | 350 | 1 | 89 | 1 | 360 | 10 | 100 | |
| 4 | 15227-12-681 | 350 | 1 | 178 | 2 | 720 | 5 | 99 | |
| 5 | 15227-12-684 | 350 | 1 | 267 | 3 | 1080 | 3.33 | 70 | |
| 6 | 15227-12-687 | 400 | 1 | 267 | 3 | 1080 | 3.33 | 90 | |
| 7 | 15227-13-690 | 400 | 1 | 178 | 2 | 720 | 5 | 91 | |
| Reaction of $NF_3$ with cesium oxalate: $NF_3 + CsC_2O_4 \rightarrow CsF + CO_2 + N_2$ 1.0" Monel reactor packed w/15-cc of $CsC_2O_4$ on graphite boat (26.0 g) | | | | | | | | | |
| 1 | 15227-22-798 | 200 | 1 | 89 | 1 | 360 | 10 | 17 | |
| 2 | 15227-22-801 | 300 | 1 | 89 | 1 | 360 | 10 | 33 | |
| 3 | 15227-22-804 | 350 | 1 | 89 | 1 | 360 | 10 | 60 | |
| 4 | 15227-23-807 | 400 | 1 | 89 | 1 | 360 | 10 | 98 | |
| 5 | 15227-23-810 | 400 | 1 | 178 | 2 | 720 | 5 | 51 | |
| 6 | 15227-23-813 | 400 | 1 | 89 | 1 | 360 | 10 | 72 | |

As can be seen in Table 1, various metal oxalates and carbonates can be effective to abate $NF_3$ from a gas containing $NF_3$ to remove up to 100% by volume of the $NF_3$. The data demonstrates that temperatures should preferably be in the range of 300–450° C. and the flow rate must be set to allow for adequate residence time for the metal oxalate or carbonate to react with the $NF_3$. Although the experiments were conducted on a 1% by volume $NF_3$-containing helium gas, it is expected that the abatement process would be effective on other concentrations of $NF_3$, because the dilute concentrations of $NF_3$ have been the most difficult to achieve complete abatement, and therefore, this represents the most difficult test of the efficacy of the process.

Alternatively, the process of the present invention could be used in a fluidized bed in which a portion of the the metal oxalate or carbonate is continually recharged for a continuous process by removal of the metal fluoride and introduction of fresh metal oxalate or carbonate.

Preferably, the reagent is calcium oxalate, which forms calcium fluoride upon reaction with $NF_3$. The calcium fluoride is more amenable to handling and disposal. The metal oxalates can be pyrolized to the corresponding carbonate at approximately 350° C. for disposal.

The present invention represents a safer, more environmentally desirable process for $NF_3$ abatement. In the case of The present invention has been set forth with regard to several preferred embodiments, but the full scope of the present invention should be ascertained from the claims which follow.

We claim:

1. A process for abatement of $NF_3$ in gas streams containing $NF_3$ comprising contacting said gas stream containing $NF_3$ with a reagent selected from the group consisting of metal oxalates and mixtures thereof to abate said $NF_3$.

2. The process of claim 1 wherein said metal is selected from the group consisting of alkali metals, alkali earth metals and mixtures thereof.

3. The process of claim 1 wherein said reagent is sodium oxalate.

4. The process of claim 1 wherein said reagent is calcium oxalate.

5. The process of claim 1 wherein said reagent is cesium oxalate.

6. The process of claim 1 wherein the temperature of said reaction conditions is in the range of 300 to 450° C.

7. The process of claim 1 wherein said $NF_3$ is present in said gas containing $NF_3$ in an amount of no greater than 1% by volume.

8. The process of claim 1 wherein said gas containing $NF_3$ contacts said reagent in a packed bed of said reagent.

9. The process of claim 1 wherein said gas containing $NF_3$ contacts said reagent in a fluidized bed of said reagent.

10. The process of claim 1 wherein said $NF_3$ is abated to less than 10 ppm by volume.

* * * * *